Figure 1:
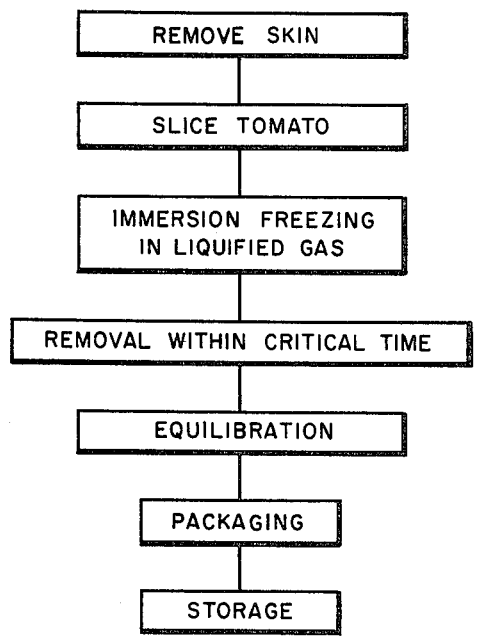

May 10, 1966  R. C. WEBSTER ET AL  3,250,630

PRESERVATION OF TOMATOES BY FREEZING

Filed April 26, 1963

INVENTORS
ROBERT C. WEBSTER
BY E. JOSEPH BENSON

AGENT

United States Patent Office 3,250,630
Patented May 10, 1966

3,250,630
PRESERVATION OF TOMATOES BY FREEZING
Robert C. Webster and Ernest J. Benson, Madison, Wis., assignors to Air Reduction Company, Incorporated, New York, N.Y., a corporation of New York
Filed Apr. 26, 1963, Ser. No. 275,932
4 Claims. (Cl. 99—193)

This application is a continuation-in-part of U.S. Serial No. 154,622, filed November 24, 1961, and now abandoned.

This invention relates to the treating of tomatoes for preservation in a frozen state.

It is an object of the invention to provide an improved method of preserving tomatoes by freezing. Previously known methods for freezing have not been successful with tomatoes because of the breakdown of the cell structure; and methods that froze the tomatoes quickly enough to avoid breakdown of the cell structure have caused cracking of the tomatoes. These cracks caused the tomatoes to break apart as they thawed, and even though the cell structure is still intact, the broken tomatoes are unattractive in appearance and their marketability is seriously impaired.

This invention also protects the tomatoes from change in taste and ordor during extensive periods of storage. An important factor in this improved result is the reducing of the relative enzyme activity (peroxidase and others) of fresh tomatoes by a quick heating followed by removal of the skin. The tomato is then cut into slices or pieces and frozen quickly by immersion in a bath of liquefied gas, such as nitrogen or nitrous oxide, and for immersion times within a critical range. Improved results are obtained by selecting tomatoes for size, structural formation and maturity, as will be explained in detail.

With this invention, the outer portions of the tomatoes are preferably heated quickly, for example by a short dip in boiling water; the skin is then removed; and the tomatoes are cut into pieces preferably slices cut substantially normally to the core of the tomato; but the tomatoes can be cut into chunks within the broader aspect of the invention. The reason for cutting the tomatoes into pieces is that experience has shown that there is no marketable variety of tomato that can be frozen all the way through, by quick freezing, in an uncut state, without having the outer portions of the tomato crack. By a unique combination of tomato selection, reduction in enzyme activity, quick freezing, limited mass, and control of freezing time, this invention makes it possible to freeze tomatoes and subsequently thaw them without impairing the appearance, texture, taste or odor of the sliced or wedged tomato.

In accordance with one method of the invention, the tomato is frozen part way through, and is then removed from the liquefied gas. The freezing for the full thickness of the tomato continues as a result of heat flow from the unfrozen portion into the frozen portion.

Other objects, features and advantages of the invention will appear or be pointed out as the description proceeds.

Figure 2:
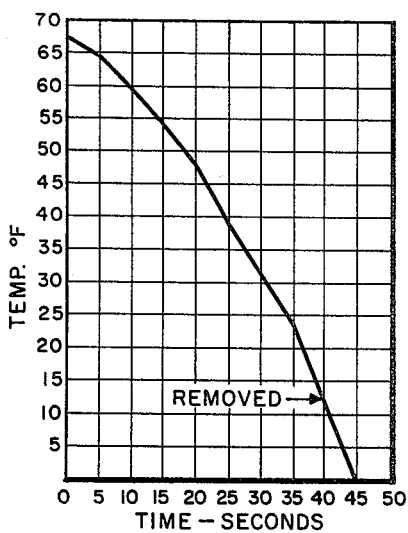
Figure 3:
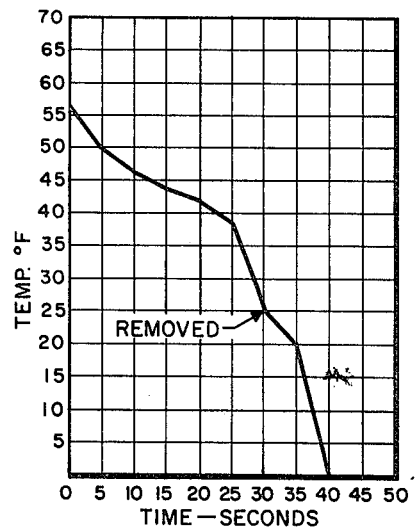

In the drawing, forming a part hereof, in which like reference characters indicate corresponding parts in all the views:

FIGURE 1 is a flow diagram illustrating successive steps in the treatment of tomatoes in accordance with this invention; and FIGURES 2 and 3 are charts showing the freezing time curves for tomatoes which are frozen in accordance with this invention.

This invention is suitable for vine ripened tomatoes, but this ripening is preferably not to full maturity. The tomatoes best suited for this invention are those which according to government specifications are graded to be "high number 2" or "low number 1." While the invention can be used for tomatoes or other maturities, the less mature do not have as good a flavor and the completely mature are more sensitive to textural damage. The tomato should have a "natural red color."

Maturity is perhaps the most important factor in determining the quality of a frozen tomato slice. Actually maturity is closely related to firmness. A low number 1 tomato is most desirable for freezing but this rating is based only on color. However, in many cases when a tomato reaches a high number 1 color, it is already approaching over-maturity and inherent softening. This is not true in every case, since certain high pigment tomatoes have a slightly redder color, even though the tomato is slightly more immature. Therefore, firmness is an important factor in choosing tomatoes for slicing and freezing. A high number 1 tomato can be an excellent freezing tomato, if initially it is firm. A highly pigmented tomato is desirable for this characteristic.

Soft tomatoes, whether they be soft from overmaturity or from handling, will result in the following: (1) loss of seed and juice during processing operations such as slicing; (2) they will thaw poorly with a resultant softer product and give an overripe appearance upon thawing.

A higher solids content is desirable for freezing tomato slices. These can be obtained in paste-type tomatoes, rather than juice types. It is desirable that there be a relatively high ratio of tissue to vacuole, that is, more meaty tissue to cavity area. A large center tissue mass with relatively smaller vacuoles is more desirable than an irregular formation of meaty tissue throughout the tomato slice with interspersed vacuole area.

Firmness and texture can be determined by a Kramer Lee Shear Press. This instrument records on a strip chart the amount of force required for a shearing head to shear through the tomato or tomato slice. With acceptable varieties and grades of tomatoes, before the skin was removed, the Shear Press test showed a variation of from 66 to 225 lbs. of force; and with the skin removed a variation of from 45 to 113 lbs. of force. These values are given by way of illustration.

The whole tomato (raw) is heat treated by dipping in boiling water for ten to thirty seconds. Other methods of quick heat treating can be used, the temperature should reach at least about 200° F. Longer times up to 40 seconds may be used for such heat treatment with greater inactivation of enzymes, but some tissue deterioration. The heating should be confined to the skin and he immediately adjacent portions of the tomato. The tomato should not be "cooked" for any substantial distance below the skin. Heating that substantially reduced enzyme activity in and immediately under the skin, without softening the tomato by cooking, are the considerations that must control the heat treating step. While some softening of the tissue under the skin can be tolerated, it must not extend in as far as the locules. However, excessive duration promotes destruction of the tissue in the heated area. Such heat treatment is advantageously performed prior to skin removal and facilitates removal of the skin, accomplished by hand or mechanical peeling. The relative enzyme activity (peroxidase) of the entire fruit is reduced from 50 to 65 percent or more, depending upon the variety, by the heat treatment and the removal of the skin; and with the reduced enzyme activity the keeping quality of the frozen fruit without change of taste or smell is greatly improved.

The whole tomatoes, after removal of the skins and heat treatment as described above, are cut to form pieces such as slices or chunks. Advantageously slices of about ¼" to ⅜" thickness, formed by making a series of spaced parallel cuts through the tomato, may be used effectively. Slices of about ⅜" in thickness are of a particularly suitable size—the end slices are discarded if thinner than the other slices or if a stem shows on the top slice. Alternatively, pieces substantially in the form of wedges or the like such as may be formed by making a series of inwardly extending radial cuts through the tomato also may be used effectively. Advantageously, such wedge segments may have a thickness at the outer arcuate portion of the wedge in the order of 1" or less.

If the tomato is of a variety and maturity which makes the slices or pieces firm, no pretreatment for firming is necessary before freezing. However, if the tomato pieces are not sufficiently firm they can be given a pretreatment to improve the firmness by dipping them in an isotonic salt such as calcium glucomate and/or calcium lactate. Calcium chloride is less desirable because even though it is efficient in firming the tomato slice, it produces a change in flavor. This firming step is used only when needed.

The tomato pieces are frozen quickly by immersion in a batch of liquefied gas, preferably nitrogen or nitrous oxide. The temperature of the freezing bath advantageously is at least as low as about −100° F. Liquid nitrous oxide has a normal boiling point of −128° F., and liquid nitrogen has a normal boiling point of −320° F., but these differences seem to have little effect upon the time required to freeze the pieces of tomato.

The liquefied gases used for purposes of the invention may be employed in an open or a closed system. For example, nitrous oxide, due to its relatively greater cost is advantageously employed in a closed system with provision for reliquefying and conserving the nitrous oxide boiled away. Nitrogen, on the other hand, may be economically employed in an open system.

The economy of the freezing process is greatly influenced by the amount of heat taken out of the tomatoes by vaporization of the liquefied gas. Some economy can be realized by utilizing a cold aqueous solution to precool the tomato pieces to a temperature substantially less than room temperature before immersing them in the liquefied gas, or by exposing them to the gas evolved during the actual immersion.

The pieces of tomato are immersed in the liquefied gas, and preferably with each piece in direct contact with the liquid. Mere light spraying of the pieces with liquefied gas is not sufficient because the pieces do not freeze quickly enough. However a spraying application can be used when it is sufficient to freeze quickly enough to prevent damage to the cellular structure, and such techniques are to be regarded as "immersion."

The pieces of tomato are frozen by such immersion in the liquefied gas. Although there is little difference between the freezing points of different varieties of tomatoes, they all freeze slightly below the freezing point of water. Immersion for longer than necessary is to be avoided for two reasons. One is that freezing the pieces below the temperature at which they are to be shipped or stored is uneconomical; but a much more important reason is that the pieces often fracture or crack if immersed too long in the liquefied gas.

This cracking phenomenon is not thoroughly understood, but apparently it has something to do with the fact that as the outer portions of the pieces of tomato freeze solid and contract, there is a concentration of unfrozen matter toward the center portion of the piece. Whole tomatoes immersed in liquefied gas fracture or crack before sufficient heat can be withdrawn from the inner portion to reduce the interior portion temperature below freezing. The same is true of large pieces of tomato. It appears that the outer portion freezes and contracts and may crack even though the interior of the piece is frozen. Even ¼" slices of tomato crack if left in the liquefied gas longer than about 60 seconds.

It is a feature of this invention that the pieces of tomato are withdrawn from the liqufied gas before they have been submerged long enough to cause cracking.

It is another feature that the pieces of tomato are thin enough so that they can be frozen all the way through after a immersion period less than that at which cracking occurs. This does not mean that the piece of tomato must freeze all the way through during the time that it is immersed. It is sufficient that the outer portion of the piece be frozen sufficiently below the freezing point so that it has a heat capacity sufficient to withdraw the heat by conduction from the center interior portion of the piece with a resulting average temperature for the whole piece substantially below freezing.

A ¼" slice of tomato will freeze and reach a temperature of 0° F., in approximately 30 seconds of immersion in nitrogen or nitrous oxide with no cracking. There is some slight variation in time, depending upon the initial temperature, the variety of the tomato and the degree of ripeness. There is a higher moisture content in the more mature tomatoes. Since this invention is primarily intended for vine-ripened tomatoes, the illustrations given assume such a condition.

One-quarter inch slices, left immersed for longer than about 50 seconds cool substantially below 0° F. and crack. These cracks cause the pieces to pull apart upon thawing, as previously explained. A period of about 25 to about 40 seconds appears to be the most desirable immersion time for slices of this size. Although the slice is preferably not completely frozen when withdrawn from the bath in 25 seconds, it will be completely frozen within the next 10 seconds as the result of conduction of heat from the center interior portion into the outer portions of the piece which are substantially below freezing temperature and have sufficient heat-absorbing capacity to bring th entire slice to an average temperature below the freezing point of the tomato.

Tomato slices ⅜ of an inch in thickness require slightly longer for freezing and the optimum immersion time in nitrogen or nitrous oxide is between 35 and about 55 seconds. These larger slices can be removed from the freezing bath before they are frozen completely through and the freezing continues to completion by conduction from the center interior portion into the colder outer portions of the piece.

If the slices are not relatively uniform in thickness, some will be overfrozen and some not frozen sufficiently. The overfrozen slices tend to crack, either during freezing or else the cracks become evident on thawing. This is especially true on the outer periphery of the slice. Slices which are under-frozen do not equilibrate properly and result in a texture difference between the outer and inner portions; the cells of the inner portion being damaged by the slower freezing, as previously explained.

One of the best uses of the off gases from the freezing operation is for the equilibration of the tomato slices. These cooled gases not only allow the product to equilibrate, but also purge the slices or prevent the slices from picking up air or oxygen prior to packaging. This means that the slices will go in the package at an extremely low oxygen content, making the packaging cycle that much easier. It is evident that the gases can also be used for precooling, which results in a lower nitrogen or nitrous oxide consumption during the freezing cycle.

It is less desirable to have a substantial part of the freezing occur after the piece has been withdrawn from immersion in the liquefied gas because the freezing by conduction of heat into the outer portions of the piece becomes slower as the temperature of the outer portions increases and this causes an increase in the size of the ice crystals and some deterioration in the quality of the interior portions of the piece. It is desirable to freeze the pieces sufficiently so that where the interior is frozen by conduction after withdrawal from the freezing bath, the final temperature of the piece afer complete freezing and equalization of temperature is approximately 0° F.

This freezing of the fruit most of the way through its thickness, but not completely, while immersed in the liquefied gas, is advantageous in permitting the freezing of thicker sections of the fruit without cracking. The illustrations for times of immersion, temperatures, and size of pieces, given herein are a suitable guide.

Carbon dioxide cannot be used in a freezing bath at atmospheric pressure. It is theoretically satisfactory at pressures where the carbon dioxide can be obtained in liquid form. The necessity for pressure vessels, however, make carbon dioxide less practical than nitrogen and nitrous oxide.

Liquid oxygen is cold enough, but its use raises some practical difficulties in providing a suitably safe installation, especially for commercial manufacturing conditions. Liquid air raises similar problems, although to a lesser extent. Nitrogen and nitrous oxide are preferred for this invention and are used advantageously in the form in which they are conventionally available commercially.

FIGURE 2 is a chart showing the drop in temperature at the center of a tomato slice ⅜ of an inch in thickness. Starting at approximately room temperature (67° F.), the slice is chilled quickly and the center reaches a temperature of +13° F. in 40 seconds. It was withdrawn from immersion in the freezing bath after 40 seconds and the center portion cooled by conduction to 0° F. during the next 5 seconds.

FIGURE 3 shows the freezing of a tomato slice ⅜ of an inch thick after precooling in a salt bath to a temperature of 56° F. The slice froze to 25° F. in 30 seconds and was withdrawn from immersion in the freezing bath after 50 seconds. The center interior portion of the slice cooled by conduction to 0° F. during the next 10 seconds.

In practice, tomatoes cut into wedge-shaped segments are cut along radial planes substantially parallel to the stem or core of the tomato. The thicker end of the wedge is of about a one inch dimension.

Equilibrating of the tomato slices is important for the packaging cycle. If the tomato slices are not fully frozen and equilibrated, there is danger of thraw during the packaging cycle. If the product is packaged before equilibration, under nitrogen, pillowed packages will tend to slow down further equilibration. If the slices are packaged under vacuum, equilibration will continue. In addition, sliced breakage is minimized if the product is allowed to temper and equilibrate, before packaging, to a temperature of from 0° F. to −40° F.

Packaging within a package devoid of oxygen greatly increases the time that the product can be stored without change of taste or smell. Upon subsequent thawing, the product has excellent texture and color characteristics and is of generally high quality. The pieces of tomato can be glazed with ice or other glaze, to protect them from oxygen, but it is preferable not to use a glaze because of the puddles that form when the slices are thawed for use.

The preferred embodiments of the invention have been illustrated and described, but changes and modifications can be made and some features can be used in different combinations without departing from the invention as defined in the claims.

What is claimed is:

1. A method of preserving a tomato by freezing, said tomato undergoing splitting and cracking when immersed in liquid nitrogen and frozen throughout while immersed due to the internal pressure in said tomato developed during the period of immersion, comprising the steps of sequentially heating the surface of the tomato, removing the skin of the tomato, cutting the tomato into pieces at least approximately ¼″ in thickness to reduce the thickness of the mass that is to be frozen, cooling the pieces as a result of contact with vapors evolved from liquid nitrogen, immersing the pieces in said liquid nitrogen having a temperature of about −320° F. for a period of time of at least about 25 seconds so as to freeze the outer area but not all of the mass of each piece, whereby each piece remains uncracked and unsplit, the center portion of each piece remaining unfrozen since the pieces freeze from the outside in toward the center, permanently removing the pieces from immersion in liquid nitrogen, and post-cooling the pieces with a vapor of a temperature less than about 0° F. evolved from the liquid nitrogen during which time freezing of substantially the entire mass of each piece is completed without further immersion in a liquid of cryogenic temperature, as a result of heat transfer to the cold outside portions of each piece from the unfrozen center portion, without cracking and splitting since the unfrozen center portion during immersion is able to absorb the internal pressure and since the time of freezing the center portion is then slowed down from that time of freezing found in freezing the center portion completely during a single immersion step.

2. A method of preserving a tomato by freezing, said tomato undergoing splitting and cracking when immersed in liquid nitrogen and frozen throughout while immersed due to the internal pressure in said tomato developed during the period of immersion, comprising the steps of sequentially heating the surface of the tomato to about 200° F., removing the skin of the tomato, cutting the tomato into pieces approximately ¼″ to ⅜″ in thickness to reduce the thickness of the mass that is to be frozen, cooling the pieces as a result of contact with vapors evolved from liquid nitrogen, immersing the pieces in said liquid nitrogen having a temperature of about −320° F. for a period of about 25 to 60 seconds, the center portion of each piece remaining unfrozen since the pieces freeze from the outside in toward the center, permanently removing the pieces from immersion in liquid nitrogen, and post-cooling the pieces with a vapor of a temperature less than about 0° F. evolved from the liquid nitrogen, during which time freezing of substantially the entire mass of each piece is completed without further immersion in a liquid of cryogenic temperature, as a result of heat transfer to the cold outside portions of each piece from the unfrozen center portion, without cracking and splitting since the unfrozen center portion during immersion is able to absorb the internal pressure and since the time of freezing the center portion is then slowed from that time of freezing found in freezing the center portion completely during a single immersion step.

3. A method of preserving a tomato by freezing, said tomato undergoing splitting and cracking when immersed in liquid nitrogen and frozen throughout while immersed due to the internal pressure in said tomato developed during the period of immersion, comprising the steps of sequentially heating the surface of the tomato for a period of from 10 to 40 seconds to about 200° F., removing the skin of the tomato, cutting the tomato transversely and normal to its core and into pieces approximately ¼″ to ⅜″ in thickness to reduce the thickness of the mass that is to be frozen, soaking the pieces in an isotonic salt solution so as to firm the cells of said pieces, cooling the pieces as a result of contact with vapors evolved from liquid nitrogen, immersing the pieces in said liquid nitrogen having a temperature of about −320° F. for a period of time of about 25 to 60 seconds, the center portion of each piece remaining unfrozen since the pieces freeze from the outside in toward the center, permanently removing the pieces from immersion in liquid nitrogen, and post-cooling the pieces with a vapor of a temperature less than about 0° F. evolved from the liquid nitrogen, during which time freezing of substantially the entire mass of each piece is completed without further immersion in a liquid of cryogenic temperature, as a result of heat transfer to the cold outside portions of each piece from the unfrozen center portion during immersion is able to absorb the internal pressure and since the time of freezing the center portion is then slowed down from that time of freezing found in freezing the center portion completely during a single immersion step.

4. The method of treating a tomato as described in claim 1, including, before immersion, soaking the pieces in anisotonic salt solution so as to firm the cells of said pieces.

References Cited by the Examiner

UNITED STATES PATENTS 2,502,527  4/1950  McFarlan _____ 62—64
3,039,276  6/1962  Morrison _____ 62—64

OTHER REFERENCES

Tressler et al., "The Freezing Preservation of Foods," 1957, Avi Publishing Company, Westport, Conn., page 453.

Tressler et al., "The Freezing Preservation of Foods," 1957, Avi Publishing Company, Westport, Conn., pp. 399 to 406.

A. LOUIS MONACELL, *Primary Examiner.*

R. S. AULL, *Assistant Examiner.*